(12) United States Patent
Jang et al.

(10) Patent No.: US 12,736,090 B2
(45) Date of Patent: Sep. 15, 2026

(54) GREASE SEALING STRUCTURE OF CONSTANT VELOCITY JOINT OF VEHICLE, AND CONSTANT VELOCITY JOINT INCLUDING SAME

(71) Applicant: HANSAE MOBILITY CO., LTD., Daegu (KR)

(72) Inventors: Dal Soo Jang, Daegu (KR); Jong Uk Seo, Daegu (KR)

(73) Assignee: HANSAE MOBILITY CO., LTD., Daegu (KR)

( * ) Notice: Subject to any disclaimer, the term of this patent is extended or adjusted under 35 U.S.C. 154(b) by 224 days.

(21) Appl. No.: 18/284,999

(22) PCT Filed: Apr. 1, 2022

(86) PCT No.: PCT/KR2022/004685
§ 371 (c)(1),
(2) Date: Sep. 29, 2023

(87) PCT Pub. No.: WO2022/211566
PCT Pub. Date: Oct. 6, 2022

(65) Prior Publication Data

US 2024/0183406 A1 Jun. 6, 2024

(30) Foreign Application Priority Data

Apr. 2, 2021 (KR) ........................ 10-2021-0043465

(51) Int. Cl.
*F16D 3/84* (2006.01)
*F16D 3/223* (2011.01)

(52) U.S. Cl.
CPC ............ *F16D 3/845* (2013.01); *F16D 3/223* (2013.01); *F16D 2003/22316* (2013.01); *F16D 2300/06* (2013.01)

(58) Field of Classification Search
CPC .................... F16D 3/845; F16D 3/223; F16D 2003/22316; F16D 2300/06; F16J 3/04; F16J 3/041; F16J 3/042
See application file for complete search history.

(56) References Cited

U.S. PATENT DOCUMENTS 2,579,356 A * 12/1951 Anderson ............... F16D 3/223 464/144
3,822,570 A * 7/1974 Fisher ...................... F16J 3/042 464/146

(Continued)

FOREIGN PATENT DOCUMENTS

DE 26 05 458 A1 8/1977
JP 2004-060770 A 2/2004

(Continued)

OTHER PUBLICATIONS

Machine Translation of WO2006009230-A1 (Year: 2025).*

(Continued)

*Primary Examiner* — Gilbert Y Lee
(74) *Attorney, Agent, or Firm* — Sughrue Mion, PLLC

(57) ABSTRACT

A grease sealing structure provides sealing grease filled between an outer race and an inner race of a constant velocity joint and includes: a boot formed to be closely fitted and supported on both the outer race and the inner race; a clamping cap configured to be fastened to the outer race so that a movement in an axial direction of the outer race is limited and to press the boot in the axial direction of the outer race to ensure the boot to be tightly fitted to the outer race; and a sealing ring configured to be fastened to the boot to press the boot against an outer circumferential surface of the inner race.

17 Claims, 4 Drawing Sheets

(56) References Cited

U.S. PATENT DOCUMENTS

| | | | |
|---|---|---|---|
| 5,230,660 | A | 7/1993 | Warnke |
| 8,313,107 | B2 | 11/2012 | Hoets et al. |
| 9,494,199 | B2 | 11/2016 | Schumacher et al. |
| 10,274,020 | B2 | 4/2019 | Cassell |
| 2007/0173337 | A1* | 7/2007 | Wormsbaecher ....... F16D 3/845 464/179 |
| 2008/0194344 | A1 | 8/2008 | Niederhufner et al. |
| 2009/0239669 | A1* | 9/2009 | Yamauchi ........... B60B 27/0042 464/145 |
| 2010/0285891 | A1 | 11/2010 | Wormsbaecher et al. |

FOREIGN PATENT DOCUMENTS

| | | | | |
|---|---|---|---|---|
| JP | 2007-504410 | A | 3/2007 | |
| JP | 2007-155098 | A | 6/2007 | |
| JP | WO2006009230 | A1 * | 5/2008 | ............... F16J 3/042 |
| JP | 2009-228728 | A | 10/2009 | |
| JP | 5818390 | B2 | 11/2015 | |

OTHER PUBLICATIONS

International Search Report for PCT/kr2022/004685, dated Jun. 30, 2022.

Extended European Search Report dated Feb. 20, 2025 in Application No. 22781685.7.

* cited by examiner

【FIG. 1】
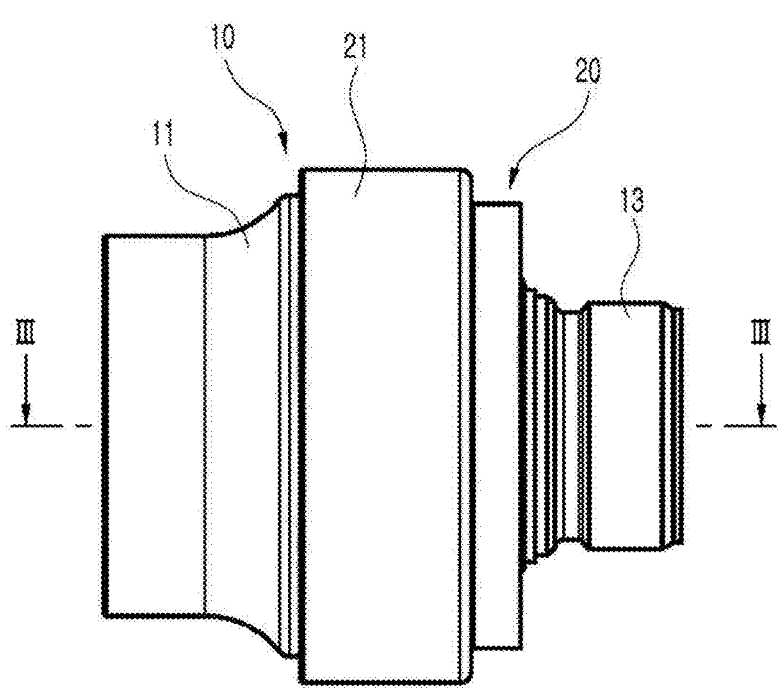

【FIG. 2】
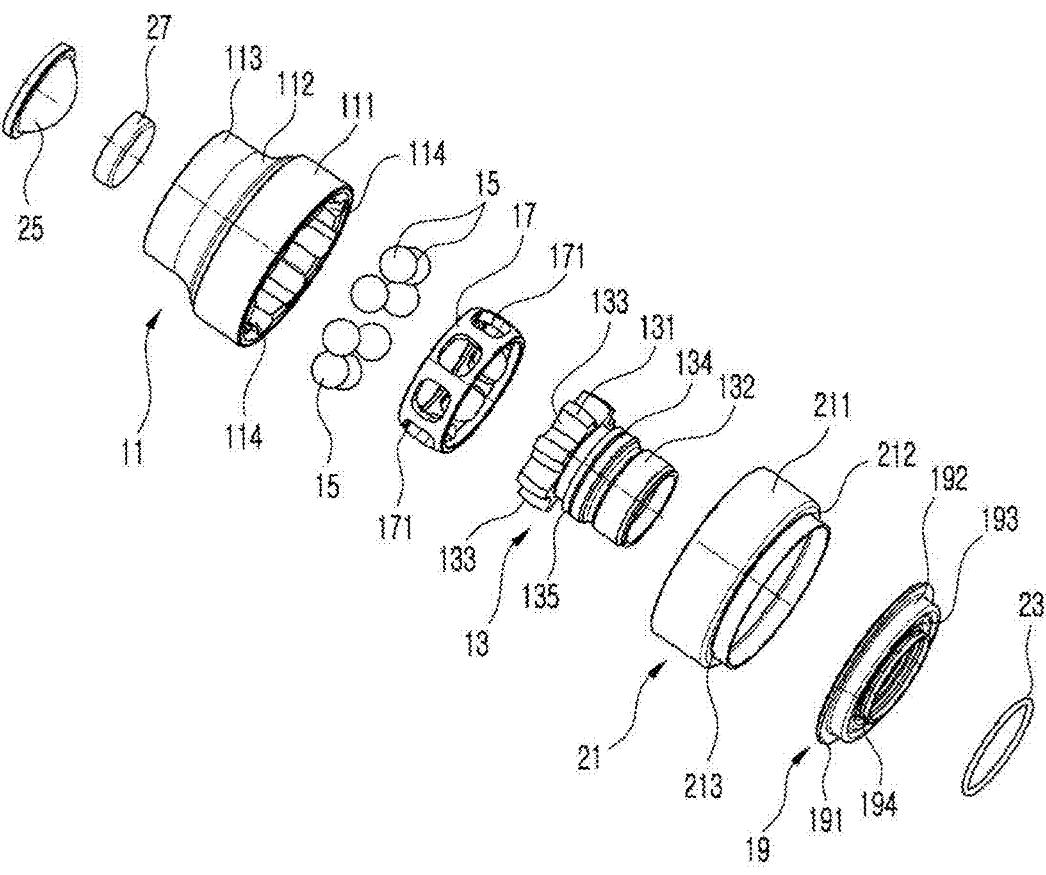

【FIG. 3】
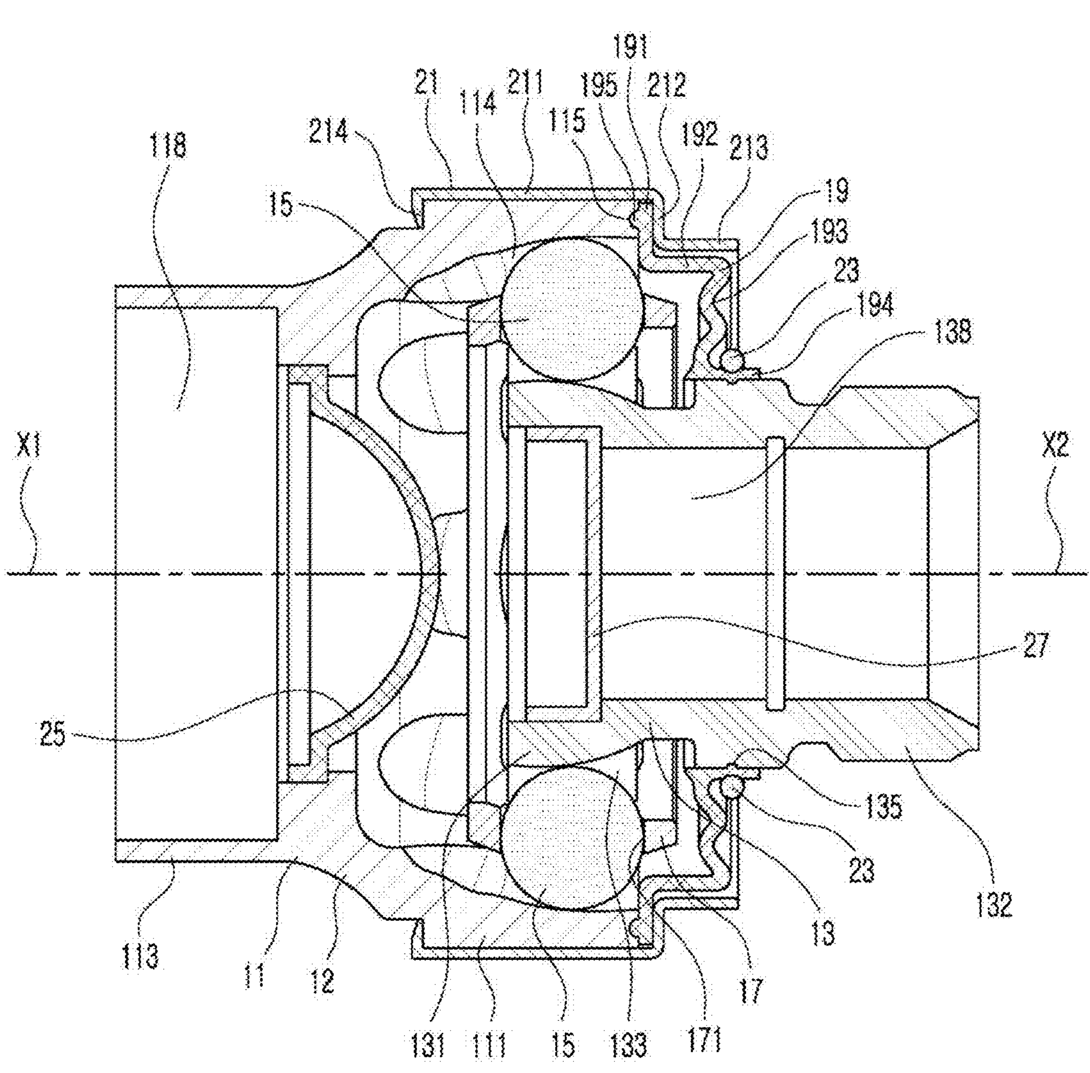

【FIG. 4】
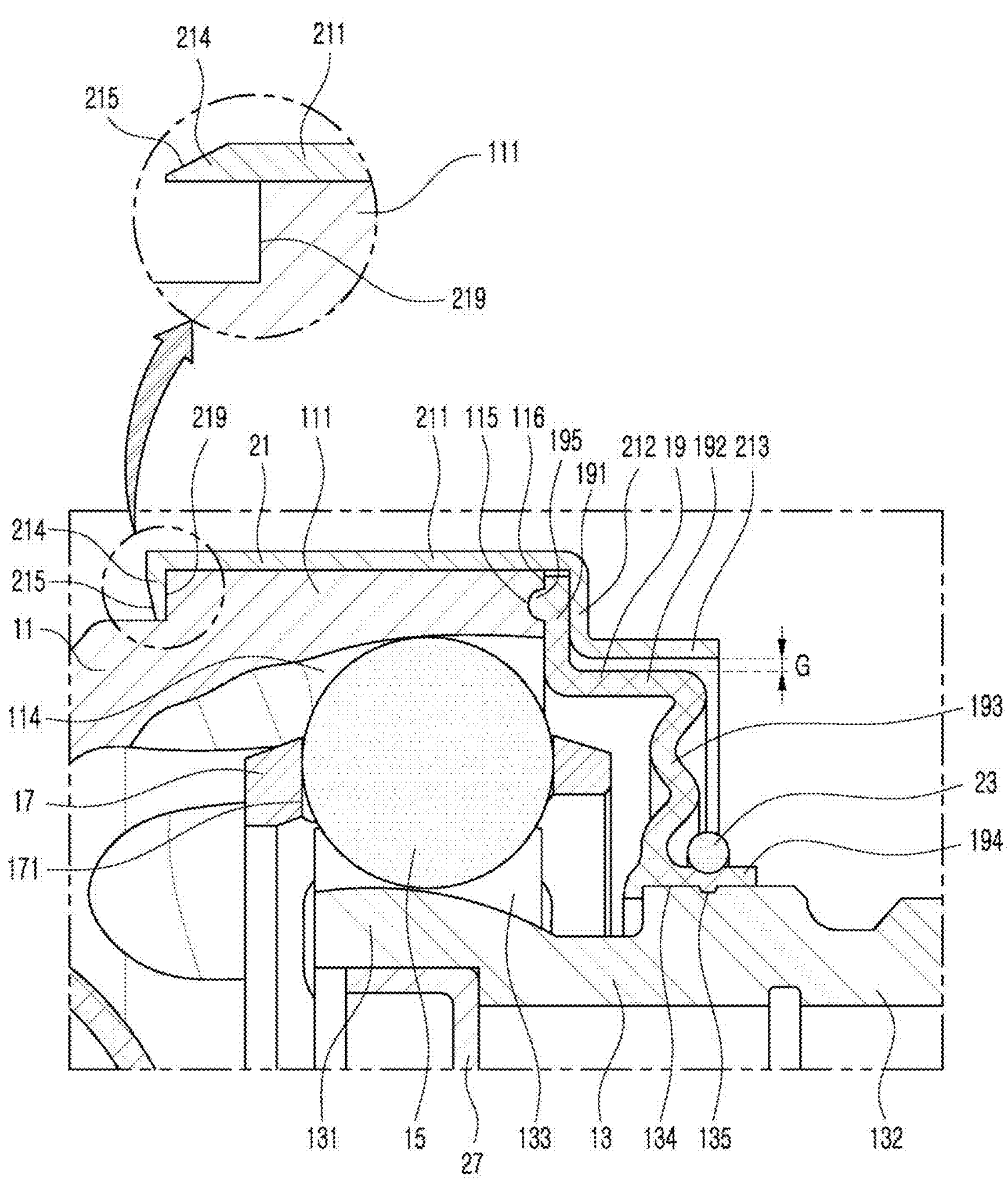

GREASE SEALING STRUCTURE OF CONSTANT VELOCITY JOINT OF VEHICLE, AND CONSTANT VELOCITY JOINT INCLUDING SAME

TECHNICAL FIELD

The present invention relates to a constant velocity joint used for transmitting driving force of a vehicle, and more specifically, to a grease sealing structure for sealing grease of a constant velocity joint.

BACKGROUND ART

A constant velocity joint is a device that transmits rotational driving force and is used as a device to transmit rotational driving force by being incorporated to a drive shaft, a propeller shaft, and the like for vehicles.

A constant velocity joint like a Rzeppa joint includes an outer race, an inner race, a plurality of balls disposed between the outer and inner races, and a ball cage that accommodates the balls. In such a constant velocity joint, the outer race typically has an open side, and the balls, the ball cage, and the inner race are inserted through this open side. A space between the outer race and the inner race where the balls and the ball cage are disposed is filled with grease for lubrication. To seal the grease, a boot is typically attached to both the outer and inner races. Generally, the boot is secured to both the outer and inner races using a crimping method with clamps. A clamp that presses and secures one side of the boot onto the radial outer surface of the outer race, and another clamp that does the same on the radial outer surface of the inner race, are commonly used. The boot is subject to continuous shape deformation and loads, so it requires excellent durability to maintain grease sealing. Because the boot is fixed to the radial outer surface of the outer race, there is an increased rotational radius, leading to a significant problem of potential radial expansion of the boot.

In particular, when the constant velocity joint is applied to the propeller shaft, it rotates at very high speeds, for instance, between 6,000 RPM and 8,000 RPM, and thus it is difficult to maintain grease sealing using the conventional widely-used crimping method using clamps. Not only does the propeller shaft rotate at approximately three times the rotational speed compared to the drive shaft typically used in front or rear wheels, but it also has a large rotational radius, leading to a significant potential for radial expansion. Hence, when applying the conventional sealing structure to the constant velocity joints used in propeller shafts, there are issues with boot damage and grease leakage.

PRIOR DOCUMENTS

U.S. Pat. No. 8,313,107 (2012 Nov. 20)
U.S. Pat. No. 9,494,199 (2016 Nov. 15)

DETAILED DESCRIPTION OF THE INVENTION

Technical Object

The object of the present invention is to provide a grease sealing structure for a constant velocity joint that can effectively prevent boot damage and grease leakage, even when applied to a constant velocity joint that rotates at high speeds and have a large rotational radius.

Technical Solutions

A grease sealing structure according to an embodiment of the present invention provides sealing grease filled between an outer race and an inner race of a constant velocity joint and includes: a boot formed to be closely fitted and supported on both the outer race and the inner race; a clamping cap configured to be fastened to the outer race so that a movement in an axial direction of the outer race is limited and to press the boot in the axial direction of the outer race to ensure the boot to be tightly fitted to the outer race; and a sealing ring configured to be fastened to the boot to press the boot against an outer circumferential surface of the inner race.

The boot may include a first fixing part configured to be fastened to the outer race, a second fixing part configured to be fastened to the inner race, and a connecting part connecting the first fixing part and the second fixing part. The first fixing part may be supported on the outer race in the axial direction by the clamping cap, and the second fixing part may be configured to be supported on the inner race in a radial direction by the sealing ring.

The clamping cap may include a fastening part that is fastened to the outer race so that a movement in the axial direction is restricted, and a support part extending radially from one end of the fixing part to press the first fixing part in the axial direction.

The clamping cap may further include a movement limiting part that is bent radially inward from one end of the fastening part to restrict movement in the axial direction.

The clamping cap may further include an expansion limiting part that extends in the axial direction from an inner end of the support part and is formed to be positioned radially outward from the connecting part of the boot.

The connecting part of the boot may include an axial extension part that extends in the axial direction from a radial inner end of the first fixing part, and a corrugated part with a corrugated shape connecting the axial extension part and the second fixing part, and the expansion limiting part may be configured to surround an outer side of the axial extension part.

The expansion limiting part may be configured to be spaced apart from an outer surface of the axial extension part when the outer race and the inner race are while being a state of not angularly displaced from each other.

The expansion limiting part may be configured so that a distance separated from an outer surface of the axial extension part along the axial direction remains constant.

The expansion limiting part may be configured so that the distance separated from the outer surface of the axial extension part along the axial direction gradually increases or decreases.

A constant velocity joint according to an embodiment of the present invention includes: an outer race forming a plurality of outer ball grooves; an inner race forming a plurality of inner ball grooves that are respectively paired with the outer ball grooves; a plurality of balls that are respectively positioned in a space formed by the pair of the outer and internal ball grooves; a ball cage accommodating the plurality of balls; and a grease sealing structure that provides of grease that is filled with a space between the outer race and the inner race where the balls and the ball cage are positioned. The grease sealing structure includes: a boot formed to be closely fitted and supported on both the outer race and the inner race; a clamping cap configured to be fastened to the outer race so that a movement in an axial direction of the outer race is limited and to press the boot in the axial direction of the outer race to ensure the boot to be tightly fitted to the outer race; and a sealing ring configured to be fastened to the boot to press the boot against an outer circumferential surface of the inner race.

A groove may be formed on a support surface of the outer race where the first fixing part is supported, and the first fixing part may be provided with a sealing protrusion that is inserted into the groove.

A groove may be formed on a support surface of the inner race where the second fixing part is supported, in a position corresponding to the sealing ring.

Effects of the Invention

According to the invention, since a boot is pressurized in an axial direction of an outer race to be fixed by a clamping cap attached to an outer race, the rotation radius of the boot can be minimized, and excessive expansion of the boot can be prevented.

BRIEF DESCRIPTION OF DRAWINGS

FIG. 1 is a front view of a constant velocity joint with a grease sealing structure according to an embodiment of the invention.

FIG. 2 is an exploded perspective view of a constant velocity joint with a grease sealing structure according to an embodiment of the invention.

FIG. 3 is a cross-sectional view taken along a line III-III of FIG. 1.

FIG. 4 is an enlarged view of a portion of FIG. 3.

EMBODIMENTS FOR CARRYING OUT THE INVENTION

In the following, detailed descriptions of embodiments of the present invention will be given with reference to the attached drawings.

Referring to FIG. 1 to FIG. 3, a constant velocity joint 10 includes an outer race 11 and an inner race 13 configured to be respectively connected to separate power transmission elements. A ball 15 acts as a medium for transmitting torque and is placed between the outer race 11 and the inner race 13 in a state of being accommodated in a pocket 171 of a ball cage 17. The ball 15 may be provided in a plurality, and the outer race 11 and the inner race 13 may each have outer ball grooves 114 and inner ball grooves 133 that pair up to form spaces that accommodate each ball 15. Rotational power transmission between the outer race 11 and the inner race 13 takes place through the ball 15 placed in the space formed by the outer ball grooves 114 and the inner ball grooves 133. FIG. 2 exemplarily shows a case where eight balls 15 are provided, but the number of balls 15 is not limited to this and can vary, such as six, ten, etc.

The outer race 11 may include a power transmission part 111 with outer ball grooves 114 formed on an inner surface thereof, a connecting part 113 configured to be connected to a power transmission shaft (not shown), and a connection part 112 connecting the power transmission part 111 and the connecting part 113. The outer race 11 may form a through-hole 118 that extends along the axial direction X1 to penetrate the power transmission part 111, the connection part 112, and the connecting part 113. The inner race 13 may include a power transmission part 131 with inner ball grooves 133 formed on an outer surface thereof and a shaft part 132 extending in an axial direction X2 from the power transmission part 131. The inner race 13 may form a through-hole 138 extending along an axial direction X2 to penetrate the power transmission part 131 and the shaft part 132. For example, when a constant velocity joint according to an embodiment of the present invention is installed between a differential gear and a propeller shaft, the inner race 13 can be coupled to an output shaft of the differential gear inserted into the through-hole 138 via spline coupling, and the connecting part 113 of the outer race 11 can be coupled to a hollow shaft of the propeller shaft via welding.

The outer race 11 and the inner race 13 may be configured to rotate for power transmission while being angularly displaced from each other. In FIG. 3, the longitudinal axes X1 and X2 of the outer race 11 and inner race 13 are shown in a non-angularly displaced state where they are coaxial. In an angularly displaced state, the relative positions of the outer race 11 and the inner race 13 change, so the two longitudinal axes X1 and X2 are not aligned parallel to each other. The constant velocity joint according to an embodiment of the present invention is designed to allow the outer race 11 and the inner race 13 to rotate while being angularly displaced within a predetermined angular range.

Although not shown in the drawings, grease is filled in a space where the ball 15 and the ball cage 17 are located for lubrication. Referring to FIG. 2 and FIG. 3, to prevent the leakage of grease through the through-hole 118 of the outer race 11 and the through-hole 138 of the inner race 13, grease retainers 25 and 27 that can block these through-holes 118 and 138 can be coupled to the outer race 11 and the inner race 13 respectively.

The grease sealing structure 20 provides grease sealing between the outer race 11 and the inner race 13. The grease sealing structure 20 may include a boot 19, a clamping cap 21, and a sealing ring 23. The boot 19 is closely fitted to both the outer race 11 and the inner race 13 to prevent grease, which fills the space where the ball 15 and ball cage 17 are located, from leaking through a space between the outer race 11 and the inner race 13. The boot 19 can be tightly fitted to the outer race 11 by being pressed by the clamping cap 21 and to the inner race 13 by being pressed by the sealing ring 23.

The boot 19 may include a first fixing part 191 for fastening to the outer race 11, a second fixing part 194 for fastening to the inner race 13, and connecting parts 192 and 193 linking the first fixing part 191 and the second fixing part 194. The boot 19 may be made of a material capable of elastic deformation, such as rubber. The connecting parts 192 and 193 may be configured to allow shape deformation during operation in an angularly displaced state. The first fixing part 191 may be configured to be closely fitted to an axial support surface 116 provided at an axial end X1 of the outer race 11, and the second fixing part 194 may be configured to be closely fitted to a radial support surface 134 provided on a radial outer surface of the inner race 13.

In one embodiment of the present invention, as shown in FIG. 3 and FIG. 4, the first fixing part 191 may extend approximately perpendicular to an axial direction X1 of the outer race 11, and the second fixing part 194 may extend approximately parallel to an axial direction X2 of the inner race 13. In an embodiment of the present invention, as shown in FIG. 3 and FIG. 4, the connecting part may include two sections, namely an axial extension part 192 that extends approximately parallel to the axial direction X2 of the inner race 13 from an inner end of the first fixing part 191, and a corrugated section 193 that has a corrugated shape to connect one end of the axial extension part 192 to the second fixing part 194. The corrugated section 193 may have a corrugated shape to extend in a zigzag shape with respect to a radial direction, allowing easy displacement in both the axial direction X2 and the radial direction (vertical direction in FIG. 4).

A clamping cap 21 is configured to be fixed to the outer race 11 and pressurize the first fixing part 191 in the axial direction X1 to be fixedly secured to an axial support surface 116. In more detail, referring to FIG. 4, the clamping cap 21 includes a fastening part, i.e., an axial extension part 211, that is attached to the power transmission part 111 of the outer race 11, and a support part 212 that extends radially inward from one end of the axial extension part 211 to pressurize and clamp the first fixing part 191 in the axial direction X1. The axial extension part 211 has a hollow cylindrical shape and can be press-fitted to the power transmission part 111. In this regard, a movement-limiting part 214 is deformed by caulking to be caught by a catch 219 of the outer race 11 to provide a fastening force in the axial direction X1. For example, the movement-limiting part 214 can be press-fitted to the outer race 11 in a state extending parallel to the axial extension part 211 as shown inside a dotted circle of FIG. 4, and after press-fitted, it can be deformed as shown in FIG. 4 by caulking to be fastened to the catch 219 of the outer race 11. In this regard, to make the deformation of the movement-limiting part 214 easier, a slope 215 may be provided on the outer surface of the movement-limiting part 214.

As shown in FIG. 3 and FIG. 4, with the clamping cap 21 fixed to the outer race 11 while being constrained in the axial direction X2 by the axial extension part 211 and the movement-limiting part 214, the support part 212 pressurizes the first fixing part 191 in the axial direction X1. As a result, the first fixing part 191 of the boot 19 is closely adhered to the axial support surface 116 of the power transmission part 111 in a pressurized state in the axial direction X1. Since the first fixing part 191 of the boot 19 is fixed to the axial support surface 116 of the outer race 11 rather than to the radial outer circumference of the outer race 11, the rotation radius can be reduced.

Meanwhile, to enhance the sealing characteristics between the first fixing part 191 and the axial support surface 116, a groove 115 may be formed on the axial support surface 116, and the first fixing part 191 can be provided with a sealing protrusion 195 that inserts into the groove 115. The groove 115 and the sealing protrusion 195 may have a ring shape extending along the circumferential direction of the power transmission part 111 of the outer race 11.

The second fixing part 194 of the boot 19 may be positioned radially inward from the first fixing part 191 and at a certain distance apart axially. By pressing a radial outer surface of the second fixing part 194 with the sealing ring 23, the second fixing part 194 can be pressed against and closely adhere to a radial support surface 134 of the inner race 13. In this regard, to enhance the sealing characteristics between the second fixing part 194 and the radial support surface 134, a groove 135 may be formed in a position corresponding to the location of the sealing ring 23, and a part of the second fixing part 194 can be configured to insert into the groove 135 due to its shape deformation when pressed.

Meanwhile, according to an embodiment of the present invention, an expansion limiting part 213 is provided to restrict expansion in a radial direction (in a vertical direction in FIG. 4) expansion of the axial extension part 192, thereby limiting the radial expansion of the boot 19. As shown in FIG. 4, the expansion limiting part 213 can extend approximately parallel to the axial direction X1 from a radial inner end of the support part 212. The expansion limiting part 213 may have a hollow cylindrical shape that extends in the axial direction X1 while being radially apart outwardly from the outer circumference of the axial extension part 192. By limiting the radial expansion of the boot 19 through the expansion limiting part 213, excessive expansion of the boot 19 can be prevented, and the stress on the boot 19 can be minimized, increasing its durability. Additionally, the expansion limiting part 213 can also serve to protect the radial outer surface of the boot 19 from external contaminants or impacts. The distance between the expansion limiting part 213 of the clamping cap 21 and the axial extension part 192 of the boot 19 may have an appropriate size, and the gap between them can be maintained consistently along the axial direction or can be configured to increase or decrease.

Although the embodiments of the present invention have been described above, the scope of rights of the present invention is not limited thereto, and it encompasses all changes and modifications that are easily made by those skilled in the technical field to which the present invention pertains and are deemed equivalent thereto.

INDUSTRIAL APPLICABILITY

The present invention relates to a constant velocity joint that can be used in a vehicle's drive mechanism, so it has industrial applicability.

The invention claimed is:

1. A grease sealing structure for sealing grease filled between an outer race and an inner race of a constant velocity joint, comprising:

a boot formed to be closely fitted and supported on both the outer race and the inner race;

a clamping cap configured to be fastened to the outer race so that a movement in an axial direction of the outer race is limited and to press the boot in the axial direction of the outer race to ensure the boot to be tightly fitted to the outer race; and a sealing ring configured to be fastened to the boot to press the boot against an outer circumferential surface of the inner race, wherein the boot comprises a first fixing part configured to be fastened to the outer race, a second fixing part configured to be fastened to the inner race, and a connecting part connecting the first fixing part and the second fixing part, wherein the clamping cap comprises a fastening part that is fastened to the outer race so that a movement in the axial direction is restricted, and a support part extending radially from one end of the fastening part to press the first fixing part against an axial support surface of the outer race in the axial direction, wherein the outer race is provided with an axial support surface that is formed at an axial end thereof, the axial support surface having a groove extending along a circumferential direction, wherein the first fixing part is provided with a sealing protrusion extending the circumferential direction to correspond to a shape of the groove and is inserted into the groove.

2. The grease sealing structure of claim 1, wherein the second fixing part is configured to be supported on the inner race in a radial direction by the sealing ring.

3. The grease sealing structure of claim 1, wherein the clamping cap further comprises a movement limiting part that is bent radially inward from one end of the fastening part to restrict movement in the axial direction.

4. The grease sealing structure of claim 1, wherein the clamping cap further comprises an expansion limiting part that extends in the axial direction from an inner end of the support part and is formed to be positioned radially outward from the connecting part of the boot.

5. The grease sealing structure of claim 4, wherein the connecting part of the boot comprises an axial extension part that extends in the axial direction from a radial inner end of the first fixing part, and a corrugated part with a corrugated shape connecting the axial extension part and the second fixing part, and wherein the expansion limiting part is configured to surround an outer side of the axial extension part.

6. The grease sealing structure of claim 5, wherein the expansion limiting part is configured to be spaced apart from an outer surface of the axial extension part when the outer race and the inner race are while being a state of not angularly displaced from each other.

7. The grease sealing structure of claim 6, wherein the expansion limiting part is configured such that a distance separated from an outer surface of the axial extension part along the axial direction remains constant.

8. The grease sealing structure of claim 6, wherein the expansion limiting part is configured such that a distance separated from the outer surface of the axial extension part along the axial direction gradually increases or decreases.

9. A constant velocity joint comprising:

an outer race forming a plurality of outer ball grooves;

an inner race forming a plurality of inner ball grooves that are respectively paired with the outer ball grooves;

a plurality of balls that are respectively positioned in a space formed by a pair of the outer and internal ball grooves;

a ball cage accommodating the plurality of balls; and a grease sealing structure that provides of grease that is filled with a space between the outer race and the inner race where the balls and the ball cage are positioned, wherein the grease sealing structure comprises:

a boot formed to be closely fitted and supported on both the outer race and the inner race;

a clamping cap configured to be fastened to the outer race so that a movement in an axial direction of the outer race is limited and to press the boot in the axial direction of the outer race to ensure the boot to be tightly fitted to the outer race; and a sealing ring configured to be fastened to the boot to press the boot against an outer circumferential surface of the inner race, wherein the boot comprises a first fixing part configured to be fastened to the outer race, a second fixing part configured to be fastened to the inner race, and a connecting part connecting the first fixing part and the second fixing part, wherein the clamping cap comprises a fastening part that is fastened to the outer race so that a movement in the axial direction is restricted, and a support part extending radially from one end of the fastening part to press the first fixing part against an axial support surface of the outer race in the axial direction, wherein the outer race is provided with an axial support surface that is formed at an axial end thereof, the axial support surface having a groove extending along a circumferential direction, wherein the first fixing part is provided with a sealing protrusion extending the circumferential direction to correspond to a shape of the groove and is inserted into the groove.

10. The constant velocity joint of claim 9, wherein the second fixing part is configured to be supported on the inner race in a radial direction by the sealing ring.

11. The constant velocity joint of claim 9, wherein the clamping cap further comprises a movement limiting part that is bent radially inward from one end of the fastening part to restrict movement in the axial direction.

12. The constant velocity joint of claim 9, wherein the clamping cap further comprises an expansion limiting part that extends in the axial direction from an inner end of the support part and is formed to be positioned radially outward from the connecting part of the boot.

13. The constant velocity joint of claim 12, wherein the connecting part of the boot comprises an axial extension part that extends in the axial direction from a radial inner end of the first fixing part, and a corrugated part with a corrugated shape connecting the axial extension part and the second fixing part, and wherein the expansion limiting part is configured to surround an outer side of the axial extension part.

14. The constant velocity joint of claim 13, wherein the expansion limiting part is configured to be spaced apart from an outer surface of the axial extension part when the outer race and the inner race are while being a state of not angularly displaced from each other.

15. The constant velocity joint of claim 14, wherein the expansion limiting part is configured such that a distance separated from an outer surface of the axial extension part along the axial direction remains constant.

16. The constant velocity joint of claim 14, wherein the expansion limiting part is configured such that a distance separated from the outer surface of the axial extension part along the axial direction gradually increases or decreases.

17. The constant velocity joint of claim 9, wherein a groove is formed on a support surface of the inner race where the second fixing part is supported, in a position corresponding to the sealing ring.

* * * * *